US009061582B2

(12) United States Patent
Sawada

(10) Patent No.: US 9,061,582 B2
(45) Date of Patent: Jun. 23, 2015

(54) HYDRAULIC EXCAVATOR

(71) Applicant: KOMATSU LTD., Tokyo (JP)

(72) Inventor: Masahiro Sawada, Hirakata (JP)

(73) Assignee: KOMATSU LTD., Tokyo (JP)

( * ) Notice: Subject to any disclaimer, the term of this patent is extended or adjusted under 35 U.S.C. 154(b) by 0 days.

(21) Appl. No.: 14/123,570

(22) PCT Filed: Feb. 15, 2013

(86) PCT No.: PCT/JP2013/053720
§ 371 (c)(1),
(2) Date: Dec. 3, 2013

(87) PCT Pub. No.: WO2014/125623
PCT Pub. Date: Aug. 21, 2014

(65) Prior Publication Data
US 2014/0318882 A1 Oct. 30, 2014

(51) Int. Cl.
*B60K 13/04* (2006.01)
*E02F 9/08* (2006.01)
*F01N 3/24* (2006.01)
(52) U.S. Cl.
CPC .............. *B60K 13/04* (2013.01); *E02F 9/0866* (2013.01); *E02F 9/0883* (2013.01); *F01N 3/24* (2013.01); *Y02T 10/24* (2013.01)
(58) Field of Classification Search
CPC ......... E02F 9/0866; E02F 9/0883; E02F 9/18; Y02T 10/24; B60K 13/04

USPC ................ 180/309, 58, 291, 296, 299, 69.21, 180/69.24, 69.4, 311, 312, 89.2; 280/830, 280/831, 834
See application file for complete search history.

(56) References Cited

U.S. PATENT DOCUMENTS

| 6,430,852 B2 * | 8/2002 | Murakami ...................... 37/466 |
| 6,648,088 B2 * | 11/2003 | Gabioli ......................... 180/68.4 |
| 6,901,903 B2 * | 6/2005 | Nakajima et al. .......... 123/198 E |
| 7,193,333 B1 * | 3/2007 | Kitch ............................ 290/1 A |
| 7,204,047 B2 * | 4/2007 | Murakami ...................... 37/347 |
| 7,503,419 B2 * | 3/2009 | Miyake .......................... 180/327 |

(Continued)

FOREIGN PATENT DOCUMENTS

| DE | 1555960 A | 5/1971 |
| JP | 2008-223345 A | 9/2008 |

(Continued)

OTHER PUBLICATIONS

International Search Report for PCT/JP2013/053720, issued on May 28, 2013.

(Continued)

*Primary Examiner* — Brodie Follman
(74) *Attorney, Agent, or Firm* — Global IP Counselors, LLP

(57) ABSTRACT

A hydraulic excavator includes an engine, a selective catalytic reduction apparatus, an outer cover, a first column member, a reducing agent tank, and a reducing agent pump. The selective catalytic reduction apparatus processes exhaust from the engine. The first column member supports the outer cover. The reducing agent tank retains a reducing agent. The reducing agent pump supplies the reducing agent from the reducing agent tank to the selective catalytic reduction apparatus. The reducing agent pump is attached to the first column member.

11 Claims, 8 Drawing Sheets

(56) References Cited

U.S. PATENT DOCUMENTS

| | | | |
|---|---|---|---|
| 7,591,334 B2* | 9/2009 | Eckersley et al. | 180/69.24 |
| 7,717,218 B2* | 5/2010 | Matsumoto et al. | 180/291 |
| 8,083,019 B2* | 12/2011 | Fujita et al. | 180/291 |
| 8,186,156 B2* | 5/2012 | Kamiya et al. | 60/420 |
| 8,191,668 B2* | 6/2012 | Keane et al. | 180/296 |
| 8,459,014 B2* | 6/2013 | Kamiya et al. | 60/295 |
| 8,573,345 B2* | 11/2013 | Werner et al. | 180/69.24 |
| 8,657,048 B2* | 2/2014 | Uetake | 180/68.1 |
| 8,708,087 B2* | 4/2014 | Kashu et al. | 180/296 |
| 8,770,329 B2* | 7/2014 | Spitler | 180/68.4 |
| 8,794,673 B2* | 8/2014 | Kimura et al. | 280/834 |
| 2004/0261299 A1* | 12/2004 | Murakami | 37/347 |
| 2005/0210717 A1* | 9/2005 | Ueda et al. | 37/443 |
| 2006/0076173 A1* | 4/2006 | Eckersley et al. | 180/69.24 |
| 2006/0108309 A1* | 5/2006 | Sato et al. | 212/232 |
| 2009/0115223 A1* | 5/2009 | Tsukamoto | 296/190.04 |
| 2009/0133297 A1 | 5/2009 | Lee | |
| 2010/0236855 A1* | 9/2010 | Matsushita et al. | 180/69.2 |
| 2010/0293928 A1* | 11/2010 | Kamiya et al. | 60/295 |
| 2011/0265459 A1 | 11/2011 | Mupparapu et al. | |
| 2012/0067660 A1* | 3/2012 | Kashu et al. | 180/296 |
| 2012/0160587 A1* | 6/2012 | Robillard et al. | 180/291 |
| 2012/0205172 A1* | 8/2012 | Werner et al. | 180/69.24 |
| 2012/0247861 A1 | 10/2012 | Mizuno et al. | |
| 2013/0037551 A1* | 2/2013 | Nishiyama et al. | 220/564 |
| 2013/0313030 A1* | 11/2013 | Matsumura et al. | 180/65.1 |
| 2014/0083781 A1* | 3/2014 | Kimura et al. | 180/6.7 |
| 2014/0102085 A1* | 4/2014 | Mori et al. | 60/301 |
| 2014/0102823 A1* | 4/2014 | Mori et al. | 180/309 |
| 2014/0124284 A1* | 5/2014 | Sekiya et al. | 180/309 |
| 2014/0196975 A1* | 7/2014 | Hata et al. | 180/309 |

FOREIGN PATENT DOCUMENTS

| | | |
|---|---|---|
| JP | 2008-240695 A | 10/2008 |
| JP | 2010-261373 A | 11/2010 |
| JP | 2010-285814 A | 12/2010 |
| JP | 2013-2082 A | 1/2013 |
| WO | 2011/152306 A1 | 12/2011 |

OTHER PUBLICATIONS

The Office Action for the corresponding German application No. 11 2013 000 122.5, issued on Dec. 23, 2014.

* cited by examiner

HYDRAULIC EXCAVATOR

CROSS-REFERENCE TO RELATED APPLICATIONS

This application is a U.S. National stage application of International Application No. PCT/JP2013/053720, filed on Feb. 15, 2013.

BACKGROUND

1. Field of the Invention

The present invention relates to a hydraulic excavator.

2. Background Information

An exhaust processing apparatus which processes exhaust from an engine is mounted onto a hydraulic excavator. The exhaust processing apparatus includes a selective catalytic reduction apparatus. The selective catalytic reduction apparatus reduces nitrogen oxide (NOx) in the exhaust.

The selective catalytic reduction apparatus processes the exhaust using a reducing agent such as aqueous urea. As a result, a reducing agent tank and a reducing agent pump are mounted onto the hydraulic excavator. The reducing agent tank retains the reducing agent. The reducing agent pump supplies the reducing agent from the reducing agent tank to the selective catalytic reduction apparatus.

In the hydraulic excavator which is disclosed in Japanese Unexamined Patent Application Publication No. 2008-223345, the reducing agent tank is arranged inside a track frame. In addition, the reducing agent pump is provided in a revolving frame. In detail, the revolving frame has left and right vertical plates which extend in the front and back direction and the reducing agent pump is arranged between the left and right vertical plates. In addition, a fuel tank is arranged on the outer side of the reducing agent pump.

SUMMARY

The reducing agent pump requires periodic maintenance. However, in a case where the reducing agent pump is arranged between the left and right vertical plates, the reducing agent pump is positioned deep into the vehicle body of the hydraulic excavator. As a result, accessing the reducing agent pump is not easy. In addition, when the fuel tank is arranged on the outer side of the reducing agent pump, the fuel tank is an obstacle when accessing the reducing agent pump. As a result, maintenance work on the reducing agent pump is complicated.

An object of the present invention is to provide a hydraulic excavator where it is possible to improve ease of maintenance of the reducing agent pump.

A hydraulic excavator according to a first aspect is provided with an engine, a selective catalytic reduction apparatus, an outer cover, a first column member, a reducing agent tank, and a reducing agent pump. The selective catalytic reduction apparatus processes exhaust from the engine. The first column member supports the outer cover. The reducing agent tank retains reducing agent. The reducing agent pump supplies the reducing agent from the reducing agent tank to the selective catalytic reduction apparatus. The reducing agent pump is attached to the first column member.

A hydraulic excavator according to a second aspect is the hydraulic excavator according to the first aspect which is further provided with a second column member and a predetermined device. The second column member is arranged to be separated from the first column member in the horizontal direction. The predetermined device is arranged in the vicinity of the second column member.

A hydraulic excavator according to a third aspect is the hydraulic excavator according to the second aspect where the second column member supports the outer cover.

A hydraulic excavator according to a fourth aspect is the hydraulic excavator according to the second or third aspect where the reducing agent pump and the predetermined device are arranged at the same height.

A hydraulic excavator according to a fifth aspect is the hydraulic excavator according to any of the second to fourth aspects where the predetermined device is a fuel filter.

A hydraulic excavator according to a sixth aspect is the hydraulic excavator according to the fifth aspect which is further provided with a fuel tank for retaining fuel. The reducing agent tank, the fuel tank, the fuel filter, and the reducing agent pump are arranged to line up in this order in the vehicle front and back direction.

A hydraulic excavator according to a seventh aspect is the hydraulic excavator according to any of the first to sixth aspects which is further provided with a cooling apparatus. The cooling apparatus is arranged further to the inside than the first column member in a predetermined first direction on a horizontal plane. The reducing agent pump is arranged at a position which overlaps with the first column member when viewed from the first direction.

A hydraulic excavator according to an eighth aspect is the hydraulic excavator according to any of the first to sixth aspects which is further provided with a cooling apparatus. The cooling apparatus is arranged further to the inside than the first column member in a predetermined first direction on a horizontal plane. The reducing agent pump is arranged at a position which does not overlap with the first column member when viewed from the first direction.

A hydraulic excavator according to a ninth aspect is the hydraulic excavator according to any of the first to eighth aspects which is further provided with a center frame. The center frame extends in the vehicle front and back direction. The outer cover configures an outer side surface of the hydraulic excavator. The reducing agent pump and the reducing agent tank are arranged at the same one side with regard to the center frame.

A hydraulic excavator according to a tenth aspect is the hydraulic excavator according to the ninth aspect which is further provided with a reducing agent hose. The reducing agent hose is connected with the reducing agent pump. The reducing agent hose is arranged along the center frame.

A hydraulic excavator according to an eleventh aspect is the hydraulic excavator according to any of the first to ninth aspects which is further provided with a reducing agent hose and a support member. The reducing agent hose is connected with the reducing agent pump. The support member supports the reducing agent hose. The support member is attached to the first column member.

In the hydraulic excavator according to the first aspect, since the first column member is a member which supports the outer cover, the first column member is arranged at a position which is close to the outer cover. That is, the first column member is arranged in the hydraulic excavator at a position which is close to the outside. Accordingly, by attaching the reducing agent pump to the first column member, the reducing agent pump is arranged in the hydraulic excavator at a position which is close to the outside. Due to this, accessing the reducing agent pump is easy and it is possible to improve ease of maintenance of the reducing agent pump.

In the hydraulic excavator according to the second aspect, the predetermined device is arranged in the vicinity of the second column member. Since the second column member is arranged to be separated from the first column member, the predetermined device is arranged to be separated from the reducing agent pump. Accordingly, it is possible to suppress the effects of the reducing agent on the predetermined device even when leakage of the reducing agent occurs by some chance when carrying out maintenance on the reducing agent pump.

In the hydraulic excavator according to the third aspect, the second column member is a member which supports the outer cover. Accordingly, in the same manner as the first column member, the second column member is also arranged in the hydraulic excavator at a position which is close to the outside. As a result, it is possible to improve ease of maintenance of the predetermined device.

In the hydraulic excavator according to the fourth aspect, the reducing agent pump and the predetermined device are arranged at the same height. As a result, it is possible to easily carry out maintenance on both of the reducing agent pump and the predetermined device.

In the hydraulic excavator according to the fifth aspect, it is possible to suppress the effects of the reducing agent on the fuel filter even when leakage of the reducing agent occurs when carrying out maintenance on the reducing agent pump.

In the hydraulic excavator according to the sixth aspect, the reducing agent tank, the fuel tank, the fuel filter, and the reducing agent pump are arranged to line up in this order in the vehicle front and back direction. As a result, when accessing the fuel filter and the reducing agent pump from the side of the hydraulic excavator, it is difficult for the reducing agent tank and the fuel tank to become obstacles.

In the hydraulic excavator according to the seventh aspect, the reducing agent pump is arranged at a position which overlaps with the first column member when viewed from the first direction. As a result, when accessing the cooling apparatus which is arranged further to the inside than the first column member, it is difficult for the reducing agent pump to become an obstacle.

In the hydraulic excavator according to the eighth aspect, the reducing agent pump is arranged at a position which does not overlap with the first column member when viewed from the first direction. As a result, access to the reducing agent pump is easier.

In the hydraulic excavator according to the ninth aspect, the reducing agent pump and the reducing agent tank are arranged at the same one side with regard to the center frame. Accordingly, it is possible to shorten a member which connects the reducing agent pump and the reducing agent tank.

In the hydraulic excavator according to the tenth aspect, the reducing agent hose is arranged along the center frame. As a result, it is possible to protect the reducing agent hose.

In the hydraulic excavator according to the eleventh aspect, the reducing agent hose is supported by the first column member via the support member. Accordingly, the reducing agent pump and the reducing agent hose are installed in the same vibration system. As a result, by reducing the difference in vibration between the reducing agent hose and the reducing agent pump, it is possible to reduce the effects of vibration on the reducing agent hose and the reducing agent pump, for example, the effects of vibration on a connecting section of the reducing agent hose and the reducing agent pump.

DETAILED DESCRIPTION OF THE EMBODIMENT(S)

Figure 1:
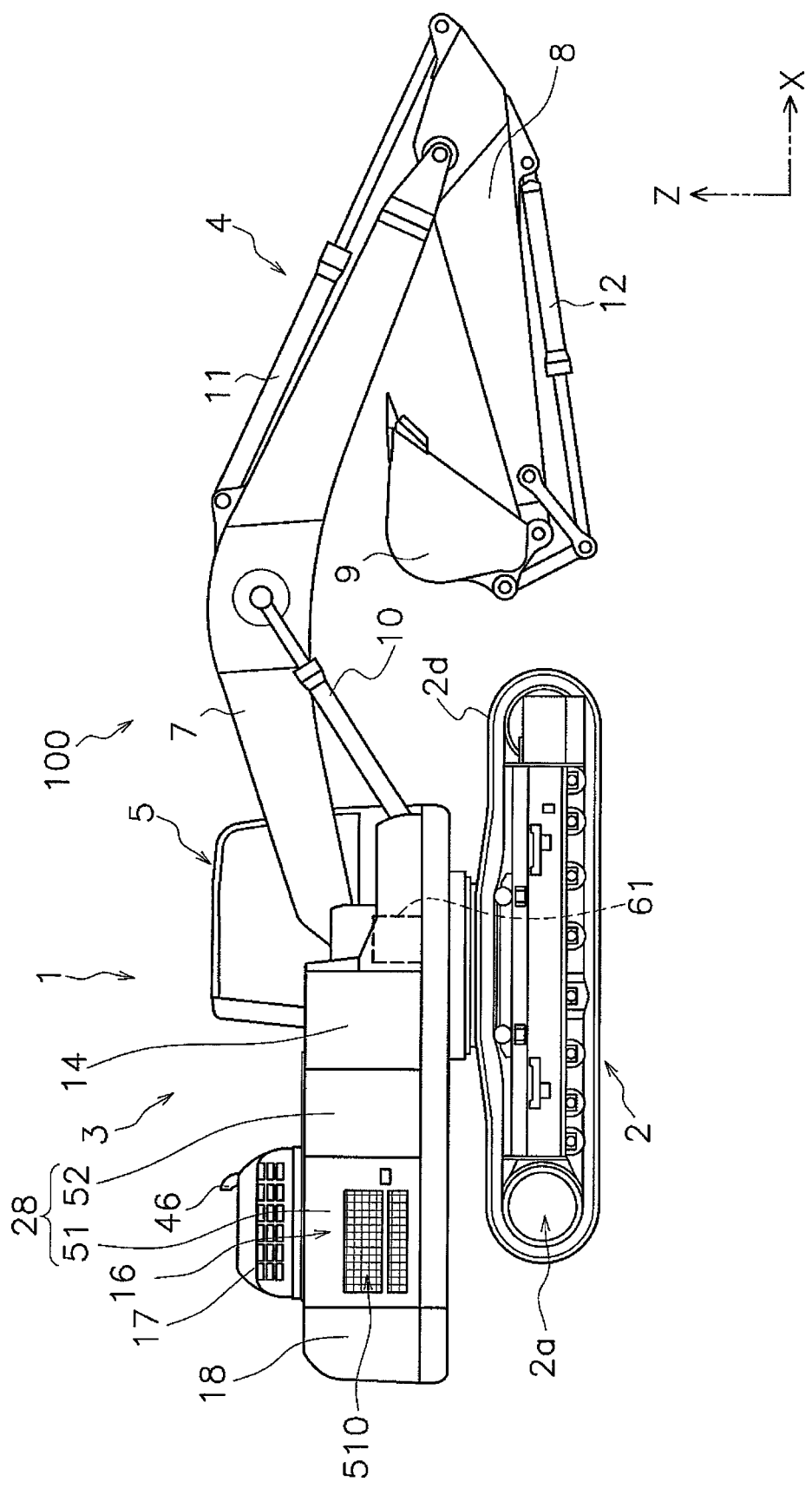
FIG. 1 is a side surface diagram of a hydraulic excavator according to an embodiment.
Figure 2:
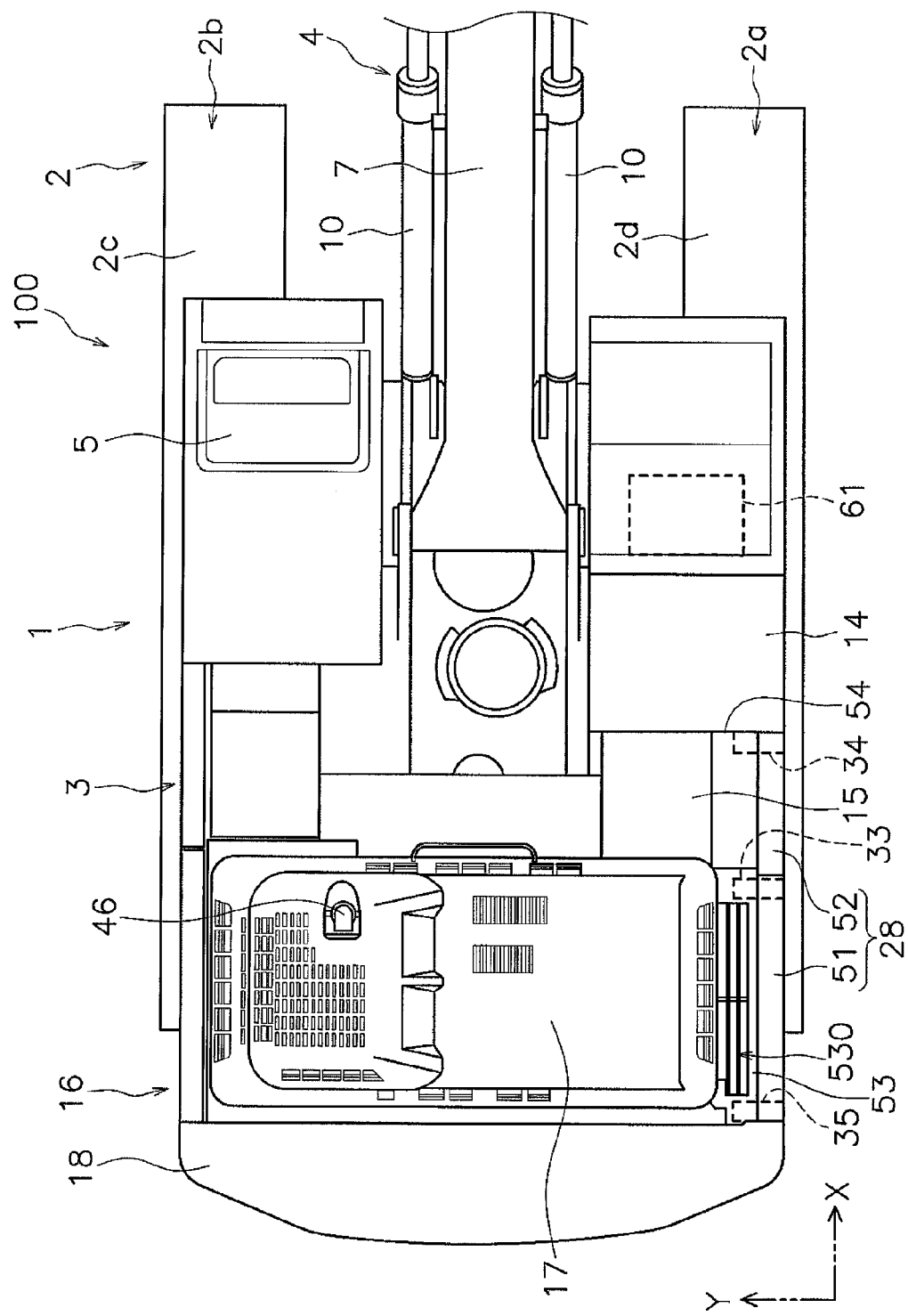
FIG. 2 is a planar diagram of the hydraulic excavator.

Below, a hydraulic excavator 100 according to an embodiment of the present invention will be described with reference to the diagrams. FIG. 1 is a side surface diagram of the hydraulic excavator 100. FIG. 2 is a planar diagram of the hydraulic excavator 100. As shown in FIG. 1 and FIG. 2, the hydraulic excavator 100 is provided with a vehicle body 1 and a work implement 4.

The vehicle body 1 has a moving body 2 and a revolving body 3. As shown in FIG. 2, the moving body 2 has a pair of moving apparatuses 2a and 2b. The moving apparatus 2a has a track 2d. The moving apparatus 2b has a track 2c. The moving apparatuses 2a and 2b move the hydraulic excavator 100 by driving the tracks 2c and 2d using driving force from an engine 21 (refer to FIG. 3) which will be described later.

Here, in the following description, the front and back direction has the meaning of the front and back direction of the vehicle body 1. In other words, the front and back direction is a direction of the front and back as seen by an operator who is seated in a cab 5. In addition, the left and right direction or the lateral direction has the meaning of the vehicle width direction of the vehicle body 1. In other words, the left and right direction, the vehicle width direction, or the lateral direction is a direction of the left and right as seen by the operator described above. In addition, the front and back direction is shown as the X axis, the left and right direction is shown as the Y axis, and the up and down direction is shown as the Z axis in the diagrams.

The revolving body 3 is mounted onto the moving body 2. The revolving body 3 is provided to be able to revolve with regard to the moving body 2. In addition, the cab 5 is provided on the revolving body 3. The revolving body 3 has a fuel tank 14, a hydraulic oil tank 15, an engine room 16, and a counterweight 18. The fuel tank 14 retains fuel for driving the engine 21 which will be described later. The fuel tank 14 is arranged in front of the hydraulic oil tank 15. The hydraulic oil tank 15 retains hydraulic oil which is discharged from a hydraulic pump 23 (refer to FIG. 3) which will be described later. The hydraulic oil tank 15 is arranged to line up with the fuel tank 14 in the front and back direction.

The engine room 16 accommodates devices such as the engine 21 and the hydraulic pump 23 which will be described later. The engine room 16 is arranged behind the cab 5, the fuel tank 14, and the hydraulic oil tank 15. An engine hood 17 is arranged above the engine room 16. The counterweight 18 is arranged behind the engine room 16.

The work implement 4 is attached to a front section of the revolving body 3. The work implement 4 has a boom 7, an arm 8, a bucket 9, a boom cylinder 10, an arm cylinder 11, and a bucket cylinder 12. The base end portion of the boom 7 is joined to the revolving body 3 so as to be able to rotate. In addition, the base end portion of the arm 8 is joined to the front end portion of the boom 7 so as to be able to rotate. The front end portion of the arm 8 is joined to the bucket 9 so as to be able to rotate. The boom cylinder 10, the arm cylinder 11, and the bucket cylinder 12 are hydraulic cylinders and are driven using the hydraulic oil which is discharged from the hydraulic pump 23 which will be described later. The boom cylinder 10 operates the boom 7. The arm cylinder 11 operates the arm 8. The bucket cylinder 12 operates the bucket 9. The work implement 4 is driven by driving of the cylinders 10, 11 and 12.

Figure 3:
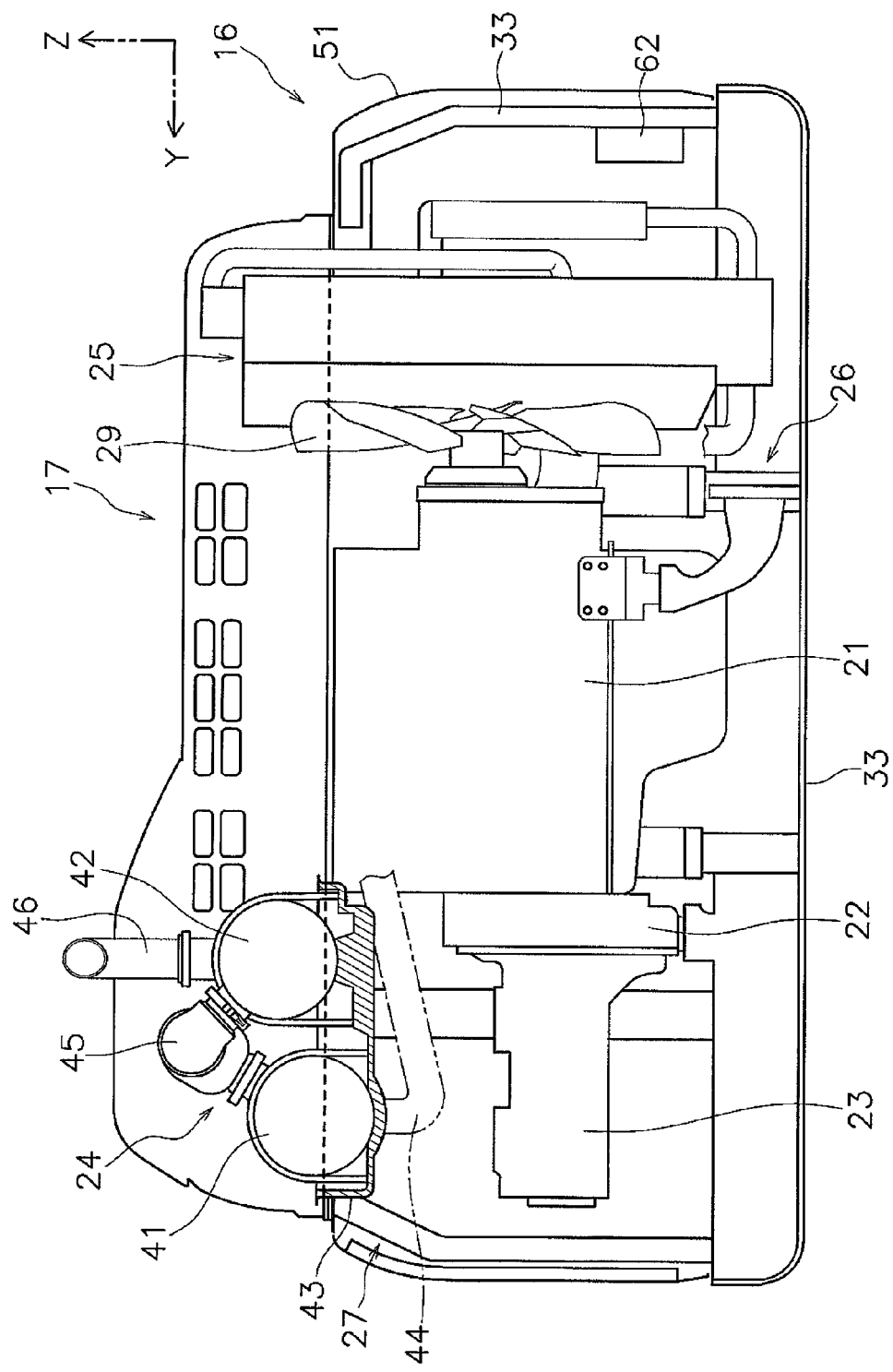
FIG. 3 is a diagram of an inner configuration of an engine room of the hydraulic excavator viewed from the rear of the vehicle.

FIG. 3 is a diagram where the inner configuration of the engine room 16 is viewed from behind the vehicle. As shown in FIG. 3, the engine 21, a flywheel housing 22, the hydraulic pump 23, and an exhaust processing apparatus 24 are arranged in the engine room 16. In addition, a cooling apparatus 25 which includes a radiator and an oil cooler is arranged in the engine room 16. The cooling apparatus 25 has a fan 29. The fan 29 generates a cooling wind inside the engine room 16. The cooling apparatus 25, the engine 21, the flywheel housing 22, and the hydraulic pump 23 are arranged to line up in the vehicle width direction.

The hydraulic pump 23 is driven by the engine 21. The hydraulic pump 23 is arranged on the side of the engine 21. That is, the hydraulic pump 23 is arranged to line up with the engine 21 in the vehicle width direction. The hydraulic pump 23 is arranged at a position which is lower than the upper surface of the engine 21.

The flywheel housing 22 is arranged between the engine 21 and the hydraulic pump 23. The flywheel housing 22 is attached to the side surface of the engine 21. In addition, the hydraulic pump 23 is attached to the side surface of the flywheel housing 22.

The exhaust processing apparatus 24 processes the exhaust from the engine 21. The exhaust processing apparatus 24 has a first processing apparatus 41, a second processing apparatus 42, and a bracket 43. The exhaust processing apparatus 24 is arranged above the hydraulic pump 23. At least a portion of the exhaust processing apparatus 24 is positioned above the engine 21.

The first processing apparatus 41 is an apparatus which processes exhaust from the engine 21. In the present embodiment, the first processing apparatus 41 is a diesel particulate filter apparatus which captures the particulate matter which is included in the exhaust using a filter. The first processing apparatus 41 incinerates the captured particulate matter using a heater which is installed in the filter. The first processing apparatus 41 has a substantially cylindrical outer shape. The first processing apparatus 41 is arranged such that the longitudinal direction of the first processing apparatus 41 is along a predetermined second direction. That is, the first processing apparatus 41 is arranged such that the longitudinal direction of the first processing apparatus 41 is along the vehicle front and back direction. Here, the second direction and the vehicle front and back direction have the same meaning in the present embodiment.

The second processing apparatus 42 is an apparatus which processes exhaust from the engine 21. In the present embodiment, the second processing apparatus 42 is a selective catalytic reduction apparatus which reduces nitrogen oxide NOx using ammonia which is obtained by hydrolyzation of aqueous urea. The second processing apparatus 42 has a substantially cylindrical outer shape. The second processing apparatus 42 is arranged such that the longitudinal direction of the second processing apparatus 42 is along the vehicle front and back direction.

The first processing apparatus 41 is arranged to be separated from the engine 21 in a predetermined first direction on a horizontal plane. The second processing apparatus 42 is arranged between the engine 21 and the first processing apparatus 41 in the first direction. That is, the second processing apparatus 42 is arranged between the engine 21 and the first processing apparatus 41 in the vehicle width direction. The first direction and the vehicle width direction have the same meaning in the present embodiment. The first processing apparatus 41 and the second processing apparatus 42 are arranged to be close to each other and are arranged to line up in a state where the respective longitudinal directions of the first processing apparatus 41 and the second processing apparatus 42 are perpendicular to the vehicle width direction. The engine 21, the second processing apparatus 42, and the first processing apparatus 41 are arranged to line up in this order in the vehicle width direction.

The hydraulic excavator 100 is provided with a first connecting pipe 44. The first connecting pipe 44 joins the engine 21 and the first processing apparatus 41. In detail, the first connecting pipe 44 is connected with a bottom section of the first processing apparatus 41.

The exhaust processing apparatus 24 has a second connecting pipe 45. The second connecting pipe 45 connects the first processing apparatus 41 and the second processing apparatus 42. The second connecting pipe 45 is positioned above the space between the first processing apparatus 41 and the second processing apparatus 42.

The hydraulic excavator 100 is provided with a third connecting pipe 46. The third connecting pipe 46 is connected with the second processing apparatus 42. In detail, the third connecting pipe 46 is connected with the top section of the second processing apparatus 42. The upper section of the third connecting pipe 46 protrudes upward from the engine hood 17.

The second processing apparatus 42 and the first processing apparatus 41 are mounted onto the bracket 43. In a state where the second processing apparatus 42 and the first processing apparatus 41 are mounted onto the bracket 43, the second processing apparatus 42, the first processing apparatus 41, and the bracket 43 are integrated.

The engine 21, the first connecting pipe 44, the first processing apparatus 41, the second connecting pipe 45, the second processing apparatus 42, and the third connecting pipe 46 are connected in series in this order. Accordingly, the exhaust from the engine 21 passes through the first connecting pipe 44 and is fed into the first processing apparatus 41. In the first processing apparatus 41, particulate matter is mostly reduced from in the exhaust. Next, the exhaust passes through the second connecting pipe 45 and is fed into the second processing apparatus 42. In the second processing apparatus 42, NOx is mostly reduced. After this, the cleaned exhaust passes through the third connecting pipe 46, which is an exhaust pipe, and is discharged to the outside.

Figure 4:
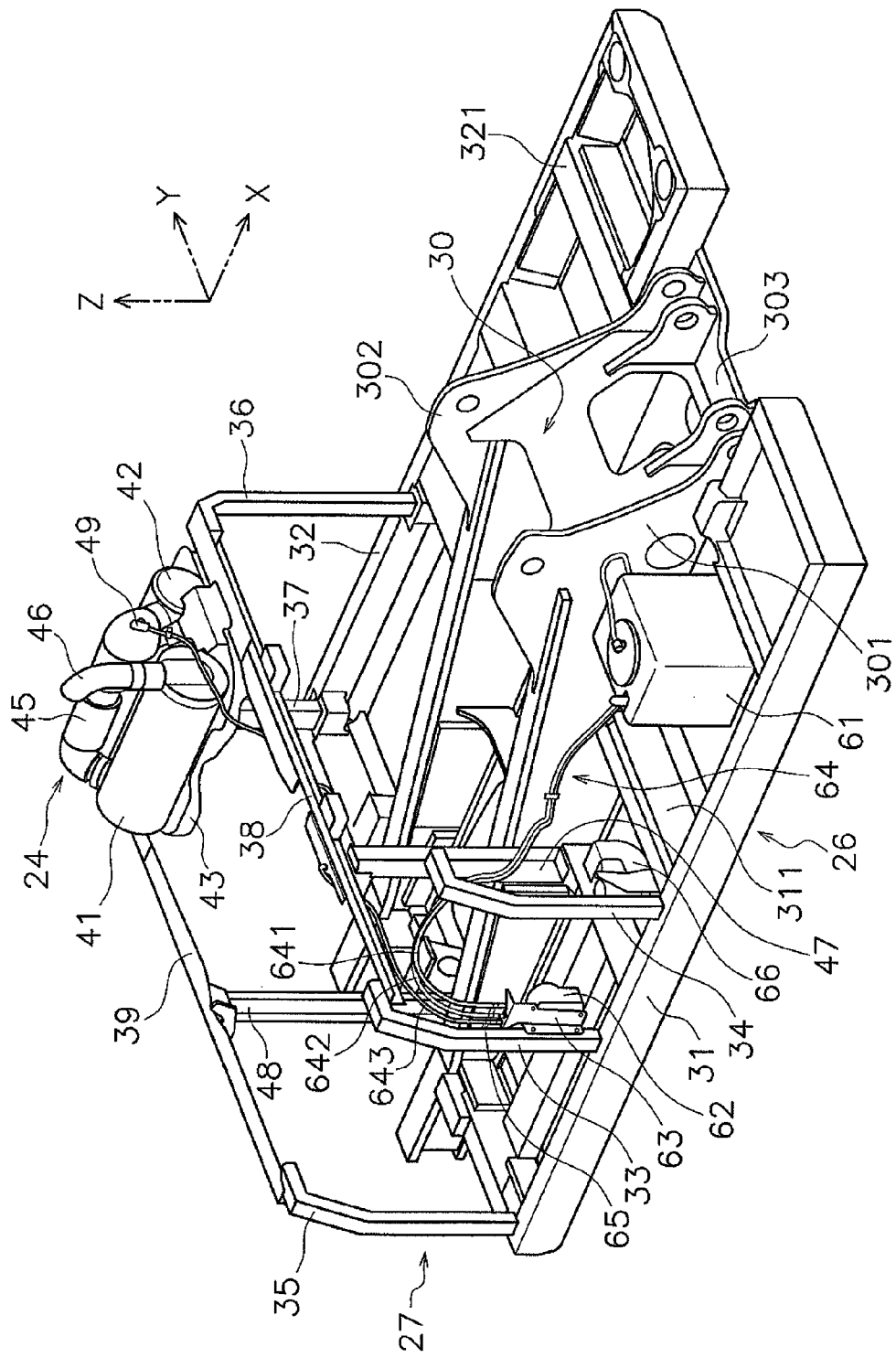
FIG. 4 is a perspective diagram illustrating a structure of a frame of the hydraulic excavator.
Figure 5:
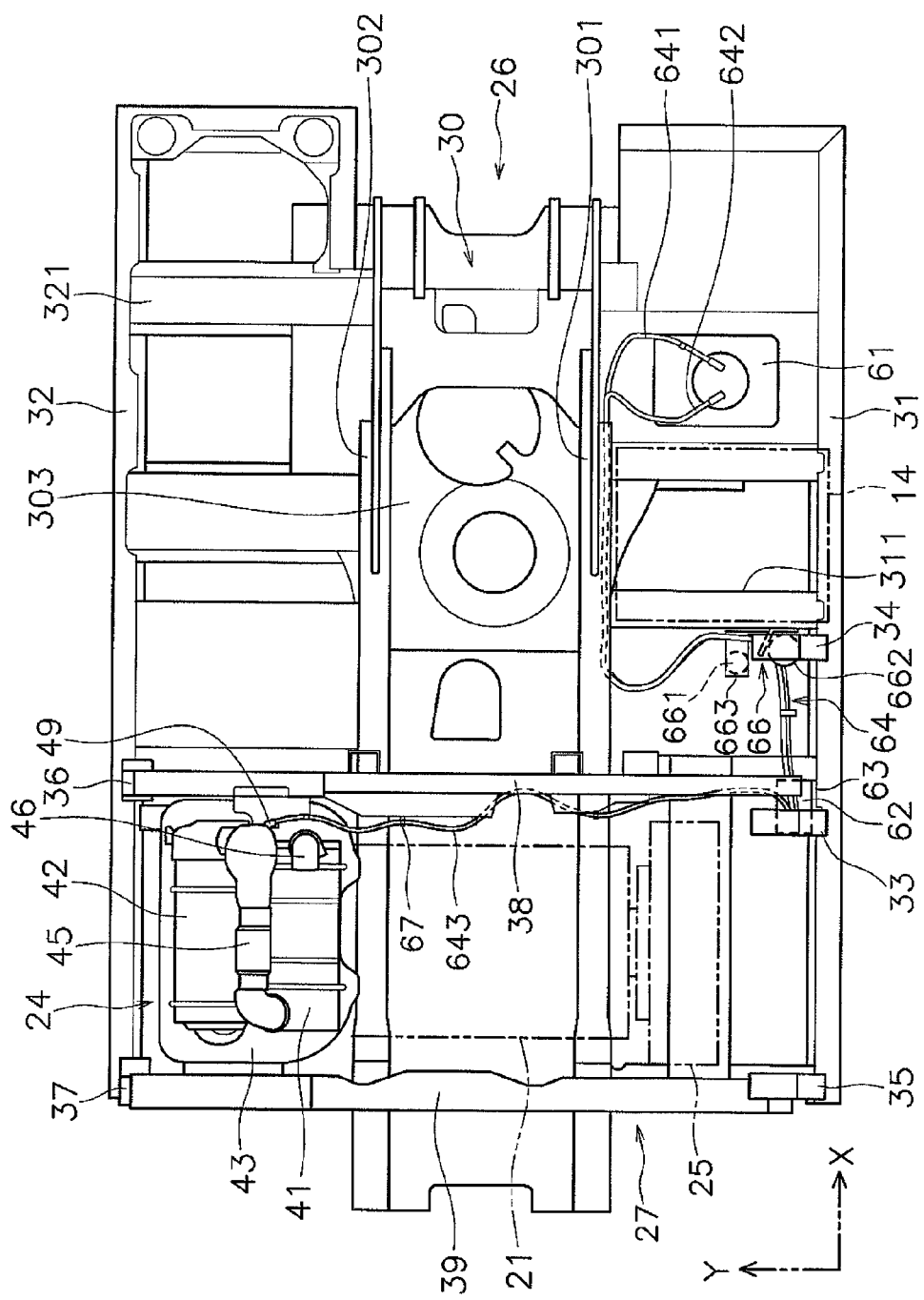
FIG. 5 is a planar diagram illustrating the structure of the frame of the hydraulic excavator.
Figure 6:
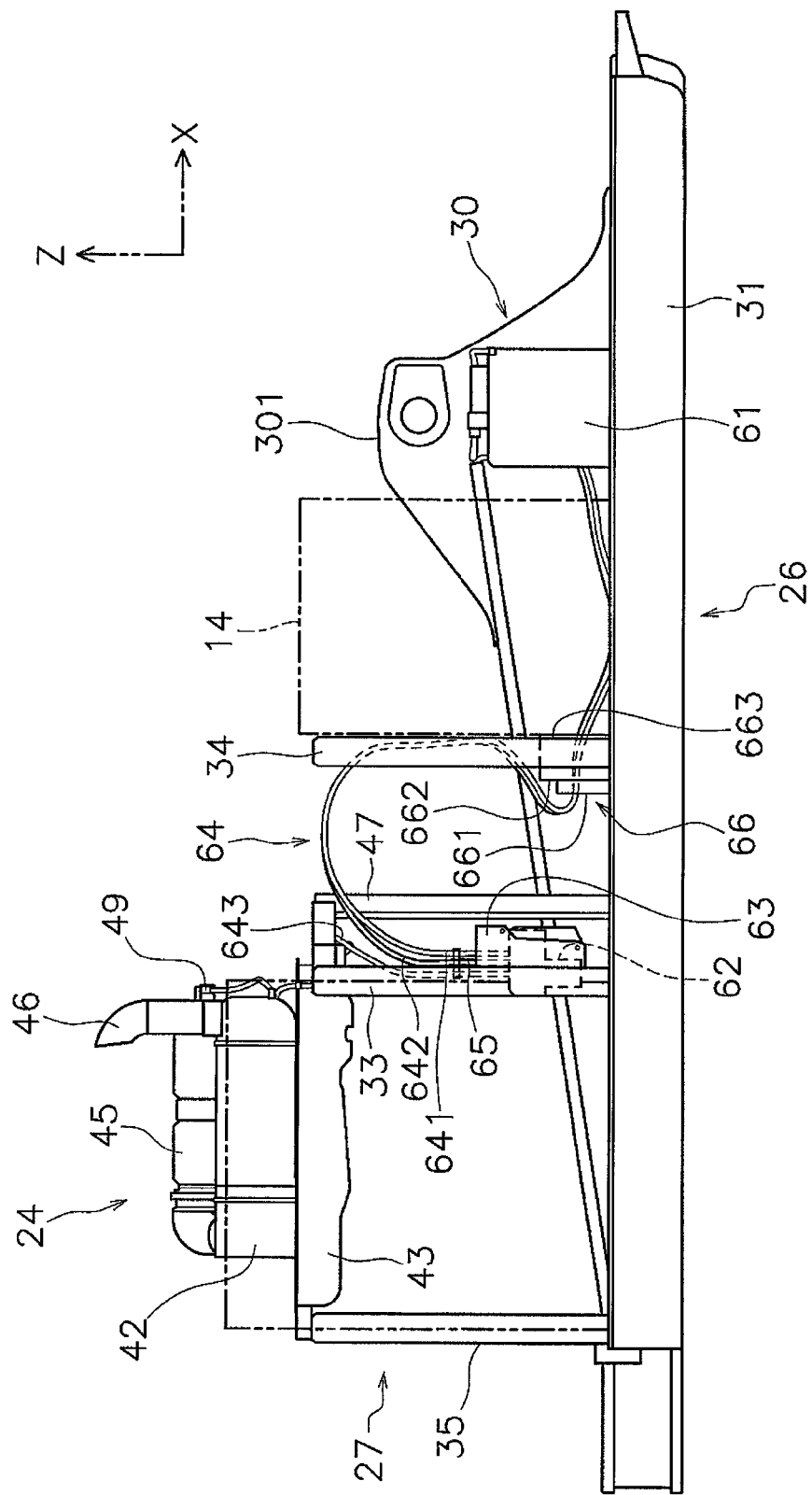
FIG. 6 is a side surface diagram illustrating the structure of the frame of the hydraulic excavator.

FIG. 4 is a perspective diagram illustrating a structure of a frame of the hydraulic excavator 100. FIG. 5 is a planar diagram illustrating the structure of the frame of the hydraulic excavator 100. FIG. 6 is a right side surface diagram illustrating the structure of the frame of the hydraulic excavator 100. Here, in FIG. 4 to FIG. 6, the structure of the frame of the hydraulic excavator 100 is illustrated along with a supply path of the reducing agent to the second processing apparatus 42. The supply path of the reducing agent to the second processing apparatus 42 will be described in detail later. In addition, in FIG. 5, the positions of the fuel tank 14, the engine 21, and the cooling apparatus 25 are shown by two-dot chain lines. In FIG. 6, the positions of the fuel tank 14 and the cooling apparatus 25 are shown by two-dot chain lines. As shown in FIG. 4 to FIG. 6, the hydraulic excavator 100 has a revolving frame 26 and a vehicle body frame 27.

The revolving frame 26 supports the engine 21 via a mounting member such as a rubber damper. The revolving frame 26 has a center frame 30, a first side frame 31, and a second side frame 32. The center frame 30 extends in the vehicle front and back direction. The engine 21 is arranged on a rear section of the center frame 30. The center frame 30 has a first center frame 301 and a second center frame 302. The first center frame 301 and the second center frame 302 are arranged to be separated from each other in the vehicle width direction. The first center frame 301 and the second center frame 302 are members with a plate shape which respectively extend in the vehicle front and back direction and the vertical direction. The center frame 30 has a bottom plate 303. The first center frame 301 and the second center frame 302 are joined by the bottom plate 303.

The first side frame 31 is arranged on one side in the vehicle width direction with regard to the center frame 30. The second side frame 32 is arranged on the other side in the vehicle width direction with regard to the center frame 30. In the present embodiment, the first side frame 31 is arranged to the right of the center frame 30. The second side frame 32 is arranged to the left of the center frame 30.

The first side frame 31 has a shape which extends in the vehicle front and back direction. The first side frame 31 is arranged to be separated in the vehicle width direction with regard to the center frame 30. The first side frame 31 and the center frame 30 are joined by a plurality of beam members 311. Here, the reference numeral 311 is appended to only a portion of the beam members in the diagrams. The second side frame 32 has a shape which extends in the vehicle front and back direction. The second side frame 32 is arranged to be separated in the vehicle width direction with regard to the center frame 30. The second side frame 32 and the center frame 30 are joined by a plurality of beam members 321. Here, the reference numeral 321 is appended to only a portion of the beam members in the diagrams.

The vehicle body frame 27 is erected on the revolving frame 26. The vehicle body frame 27 is arranged in the surroundings of the devices such as the engine 21 and the hydraulic pump 23. The exhaust processing apparatus 24 described above is attached to the body frame 27. In detail, the bracket 43 of the exhaust processing apparatus 24 is fixed to the vehicle body frame 27. The bracket 43 is attached to the vehicle body frame 27 by a fixing means such as a bolt so as to be able to be attached and detached. Accordingly, it is possible to detach the exhaust processing apparatus 24 from the vehicle by detaching the bracket 43 from the vehicle body frame 27.

The vehicle body frame 27 has a first column member 33, a second column member 34, and a third column member 35. The first column member 33 is erected on the first side frame 31. The second column member 34 is erected on the first side frame 31. The second column member 34 is arranged to be separated from the first column member 33 in the horizontal direction. In the present embodiment, the second column member 34 is arranged in front of the first column member 33. The third column member 35 is erected on the first side frame 31. The third column member 35 is arranged behind the first column member 33. The cooling apparatus 25 described above is arranged further to the inside than the first column member 33 in the vehicle width direction.

The vehicle body frame 27 has a fourth column member 36 and a fifth column member 37. The fourth column member 36 is erected on the second side frame 32. The fifth column member 37 is erected on the second side frame 32. The fifth column member 37 is arranged behind the fourth column member 36.

The vehicle body frame 27 has a first beam member 38 and a second beam member 39. The first beam member 38 and the second beam member 39 are arranged to be separated from each other in the vehicle front and back direction. The first beam member 38 is supported by the first column member 33 and the fourth column member 36. The first beam member 38 is arranged to span between the first column member 33 and the fourth column member 36. The second beam member 39 is supported by the third column member 35 and the fifth column member 37. The second beam member 39 is arranged to span between the third column member 35 and the fifth column member 37. The exhaust processing apparatus 24 described above is supported by the first beam member 38 and the second beam member 39.

The vehicle body frame 27 has a first intermediate column member 47 and a second intermediate column member 48. The first intermediate column member 47 is arranged between the first column member 33 and the fourth column member 36 in the vehicle width direction. The first intermediate column member 47 supports the first beam member 38. The second intermediate column member 48 is arranged between the third column member 35 and the fifth column member 37 in the vehicle width direction. The second intermediate column member 48 supports the second beam member 39.

As shown in FIG. 1 and FIG. 2, the hydraulic excavator 100 has an outer cover 28. The outer cover 28 is attached to the vehicle body frame 27. The outer cover 28 has a first side cover 51 and a second side cover 52. The first side cover 51 configures an outer side surface of the hydraulic excavator 100. In the present embodiment, the first side cover 51 is a right side surface of the engine room 16. As shown in FIG. 1, ventilation holes 510 are provided in the first side cover 51. The first side cover 51 is arranged on the outer side of the cooling apparatus 25. Due to the driving of the fan 29, air is sucked into the engine room 16 through the ventilation holes 510 in the first side cover 51. The first column member 33 supports the first side cover 51.

Figure 7:
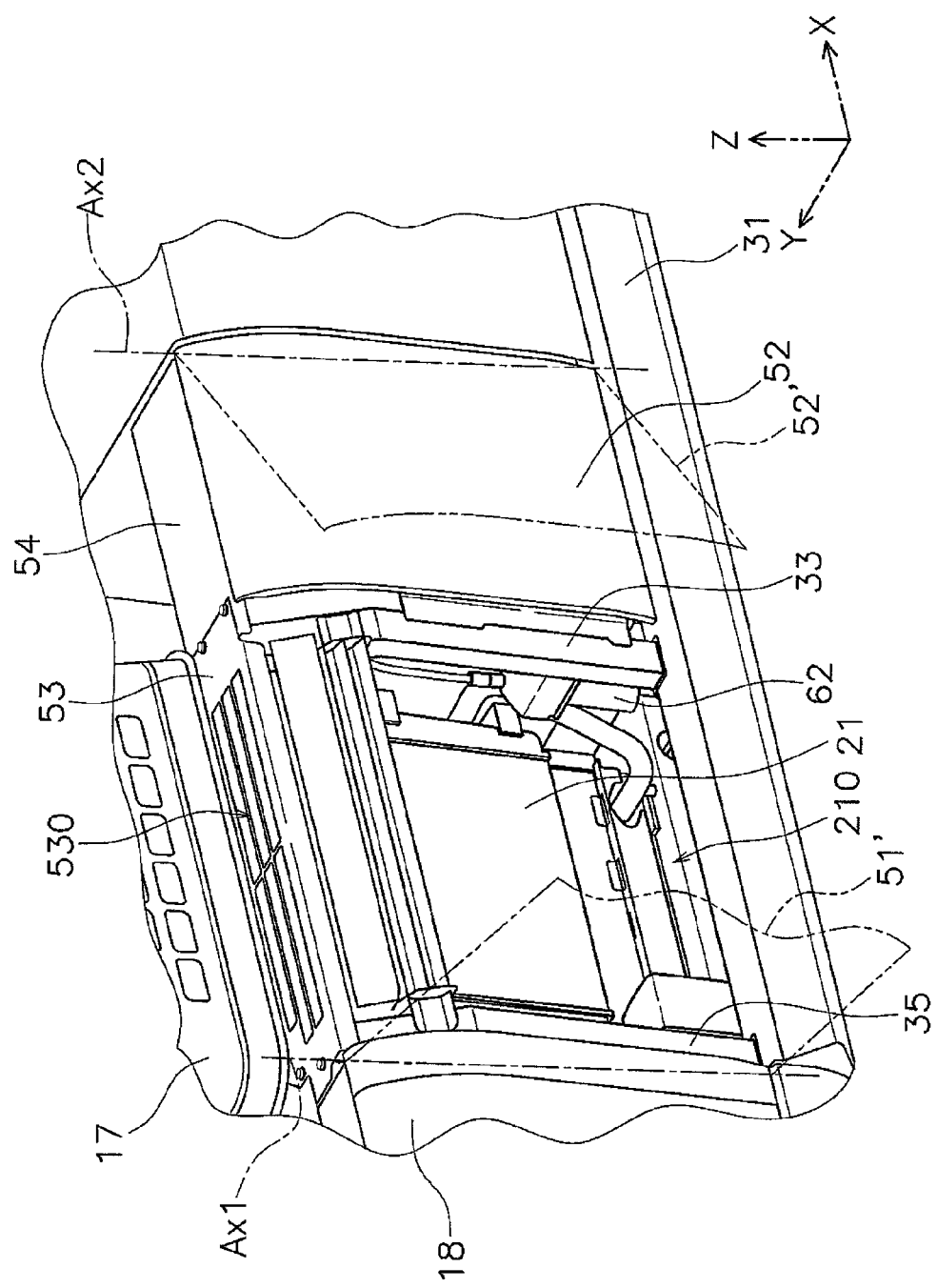
FIG. 7 is a perspective diagram illustrating a side surface rear section of the hydraulic excavator in a state where a first side cover is detached.

FIG. 7 is a perspective diagram illustrating a right side surface rear section of the hydraulic excavator 100 in a state where the first side cover 51 is detached. As shown in FIG. 7, the first side cover 51 is arranged so as to cover an opening 210 which is opposed to the cooling apparatus 25. The first side cover 51 is attached to the vehicle body frame 27 via a hinge section (which is not shown in the diagram) and is provided to be able to open and close the opening 210. Here, in FIG. 7, 51' indicates the first side cover 51 in an opened state. As shown in FIG. 7, the first side cover 51 is provided so as to be able to rotate centered on a rotation axis line Ax1 which extends in the up and down direction.

The second side cover 52 is arranged in front of the first side cover 51. The second side cover 52 configures the outer side surface of the hydraulic excavator 100. The second side cover 52 is arranged on the outer side of the hydraulic oil tank 15. The second column member 34 supports the second side cover 52. The second side cover 52 is attached to the vehicle body frame 27 via a hinge section (which is not shown in the diagram) and is provided to be able to open and close an opening between the first column member 33 and the second column member 34. Here, in FIG. 7, 52' indicates the second side cover 52 in an opened state. As shown in FIG. 7, the second side cover 52 is provided so as to be able to rotate centered on a rotation axis line Ax2 which extends in the up and down direction.

As shown in FIG. 2 and FIG. 7, the outer cover 28 has a first upper cover 53 and a second upper cover 54. The first upper cover 53 is arranged above the first side cover 51. Ventilation holes 530 are provided in the first upper cover 53. Due to the driving of the fan 29, air is sucked into the engine room 16 through the ventilation holes 530 in the first upper cover 53. The first column member 33 supports the first upper cover 53. The second upper cover 54 is arranged above the second side cover 52. The second column member 34 supports the second upper cover 54.

As shown in FIG. 4 to FIG. 6, a reducing agent ejection apparatus 49 is attached to the exhaust processing apparatus 24. In detail, the reducing agent ejection apparatus 49 is attached to the second connecting pipe 45. The reducing agent ejection apparatus 49 ejects the reducing agent into the second connecting pipe 45. The reducing agent which is ejected from the reducing agent ejection apparatus 49 is supplied to the second processing apparatus 42.

The hydraulic excavator 100 has a reducing agent tank 61 and a reducing agent pump 62. The reducing agent tank 61 retains the reducing agent which is supplied to the second processing apparatus 42. The reducing agent pump 62 supplies the reducing agent from the reducing agent tank 61 to the reducing agent ejection apparatus 49. The reducing agent tank 61 and the reducing agent pump 62 are arranged outside the engine room 16. As shown in FIG. 2, the reducing agent tank 61 is arranged in front of the hydraulic oil tank 15. The reducing agent pump 62 is arranged behind the fuel tank 14. The reducing agent pump 62 is attached to the first column member 33. In detail, the reducing agent pump 62 is attached to the first column member 33 via a bracket 63. As shown in FIGS. 5 and 6, the reducing agent pump 62 is arranged on the inner side of the first column member 33. That is, as shown in FIG. 6, the reducing agent pump 62 is arranged at a position which overlaps with the first column member 33 in a view from the vehicle width direction. As shown in FIG. 5, the reducing agent pump 62 and the reducing agent tank 61 are arranged on the same one side with regard to the center frame 30. In the present embodiment, the reducing agent pump 62 and the reducing agent tank 61 are arranged together on the right side of the center frame 30.

The hydraulic excavator 100 is provided with a reducing agent hose 64. The reducing agent hose 64 is connected with the reducing agent tank 61 and the reducing agent pump 62. The reducing agent hose 64 has a first hose section 641, a second hose section 642, and a third hose section 643. The first hose section 641 and the second hose section 642 connect the reducing agent tank 61 and the reducing agent pump 62. The third hose section 643 connects the reducing agent pump 62 and the reducing agent ejection apparatus 49. The reducing agent flows into the reducing agent pump 62 by passing through the first hose section 641. A portion of the reducing agent from the first hose section 641 is supplied to the reducing agent ejection apparatus 49 by passing through the third hose section 643. The reducing agent which remains from the first hose section 641 is returned to the reducing agent tank 61 by passing through the second hose section 642.

As shown in FIG. 5, portions of the first hose section 641 and the second hose section 642 are arranged along the center frame 30. That is, the first hose section 641 and the second hose section 642 are arranged along the center frame 30 between the center frame 30 and the fuel tank 14. In the present embodiment, portions of the first hose section 641 and the second hose section 642 are arranged on the right side of the center frame 30. Portions of the first hose section 641 and the second hose section 642 are arranged along the right side surface of the center frame 30. The first hose section 641 and the second hose section 642 are arranged behind the fuel tank 14 so as to extend from the center frame 30 toward the second column member 34 in a planar view of the vehicle. In addition, the first hose section 641 and the second hose section 642 are arranged so as to extend from the second column member 34 toward the first column member 33 in a planar view of the vehicle. Here, as shown in FIG. 6, the first hose section 641 and the second hose section 642 are arranged so as to pass through a position which is above the reducing agent pump 62 between the second column member 34 and the first column member 33 in a vehicle side surface view.

The third hose section 643 is arranged so as to pass in front of the engine 21. The third hose section 643 is substantially arranged along the first beam member 38 and the first column member 33. As shown in FIG. 6, the hydraulic excavator 100 has a first support member 65. The first support member 65 supports the first hose section 641, the second hose section 642, and the third hose section 643. The first support member 65 is attached to the first column member 33. That is, the first hose section 641, the second hose section 642, and the third hose section 643 are attached to the first column member 33 via the first support member 65.

As shown in FIG. 5, the hydraulic excavator 100 has a plurality of second support members 67. Here, in FIG. 5, the reference numeral 67 is appended to only some of the plurality of second support members 67. The second support members 67 support the third hose section 643. The second support members 67 are attached to the first beam member 38. That is, the third hose section 643 is attached to the first beam member 38 via the second support members 67.

The hydraulic excavator 100 has a fuel filter apparatus 66. The fuel filter apparatus 66 connects the engine 21 and the fuel tank 14 via a fuel hose which is not shown in the diagram. The fuel filter apparatus 66 is arranged in the vicinity of the second column member 34. In detail, the fuel filter apparatus 66 is attached to the beam members 311 which are arranged in the vicinity of the second column member 34. As shown in FIG. 5, the reducing agent tank 61, the fuel tank 14, the fuel filter apparatus 66, and the reducing agent pump 62 are arranged to line up in this order in the vehicle front and back direction. As shown in FIG. 6, the fuel filter apparatus 66 is arranged at the same height as the reducing agent pump 62. That is, at least a portion of the fuel filter apparatus 66 is arranged at the same height as the reducing agent pump 62. The fuel filter apparatus 66 has a fuel main filter 661 and a fuel pre-filter 662. The fuel main filter 661 and the fuel pre-filter 662 are attached to the beam member 311 via a bracket 663. The fuel pre-filter 662 and the fuel main filter 661 are arranged to line up in the vehicle width direction. The fuel pre-filter 662 is arranged on the outer side of the fuel main filter 661. The second column member 34 is arranged on the outer side of the fuel main filter 661. The fuel filter apparatus 66 is arranged so as to overlap with the second column member 34 in a vehicle width direction view.

The hydraulic excavator 100 according to the present embodiment has the following features.

The first column member 33 supports the first side cover 51 which is a portion of the outer cover 28. Accordingly, the first column member 33 is arranged at a position which is close to the outer cover 28. That is, the first column member 33 is arranged in the hydraulic excavator 100 at a position which is close to the outside. Accordingly, the reducing agent pump 62 is arranged in the hydraulic excavator 100 at a position which is close to the outside due to the reducing agent pump 62 being attached to the first column member 33. Due to this, accessing the reducing agent pump 62 is easy and it is possible to improve ease of maintenance of the reducing agent pump 62.

The fuel filter apparatus 66 is arranged in the vicinity of the second column member 34. Since the second column member 34 is arranged to be separated from the first column member 33, the fuel filter apparatus 66 is arranged to be separated from the reducing agent pump 62. Accordingly, it is possible to suppress the effects of the reducing agent on the fuel filter apparatus 66 even when leakage of the reducing agent occurs by some chance when carrying out maintenance on the reducing agent pump 62.

The second column member 34 is a member which supports the second side cover 52 which is a portion of the outer cover 28. Accordingly, in the same manner as the first column member 33, the second column member 34 is also arranged in the hydraulic excavator 100 at a position which is close to the outside. As a result, accessing the fuel filter apparatus 66 is easy due to the fuel filter apparatus 66 being arranged in the vicinity of the second column member 34. Due to this, it is possible to improve ease of maintenance of the fuel filter apparatus 66.

The reducing agent pump 62 and the fuel filter apparatus 66 are arranged at the same height. As a result, it is possible to easily carry out maintenance on both the reducing agent pump 62 and the fuel filter apparatus 66.

The reducing agent tank 61, the fuel tank 14, the fuel filter apparatus 66, and the reducing agent pump 62 are arranged to line up in this order in the vehicle front and back direction. As a result, when accessing the fuel filter apparatus 66 and the reducing agent pump 62 from the side of the hydraulic excavator 100, it is difficult for the reducing agent tank 61 and the fuel tank 14 to become obstacles.

The reducing agent pump 62 is arranged at a position which overlaps with the first column member 33 when viewed from the vehicle width direction. As a result, when accessing the cooling apparatus 25 which is arranged further to the inside than the first column member 33 in the vehicle width direction, it is difficult for the reducing agent pump 62 to become an obstacle.

The reducing agent pump 62 and the reducing agent tank 61 are arranged at the same one side with regard to the center frame 30. Accordingly, it is possible to shorten the reducing agent hose 64 which connects the reducing agent pump 62 and the reducing agent tank 61.

The reducing agent hose 64 is arranged along the center frame 30. As a result, it is possible to protect the reducing agent hose 64.

The reducing agent hose 64 is supported by the first column member 33 via the first support member 65. Accordingly, the reducing agent pump 62 and the reducing agent hose 64 are installed in the same vibration system. As a result, it is possible to reduce the effects due to vibration by reducing the difference in vibration between the reducing agent hose 64 and the reducing agent pump 62.

Above, an embodiment of the present invention is described but the present invention is not limited to the embodiment described above and various modifications are possible in a scope which does not depart from the gist of the invention.

Figure 8:
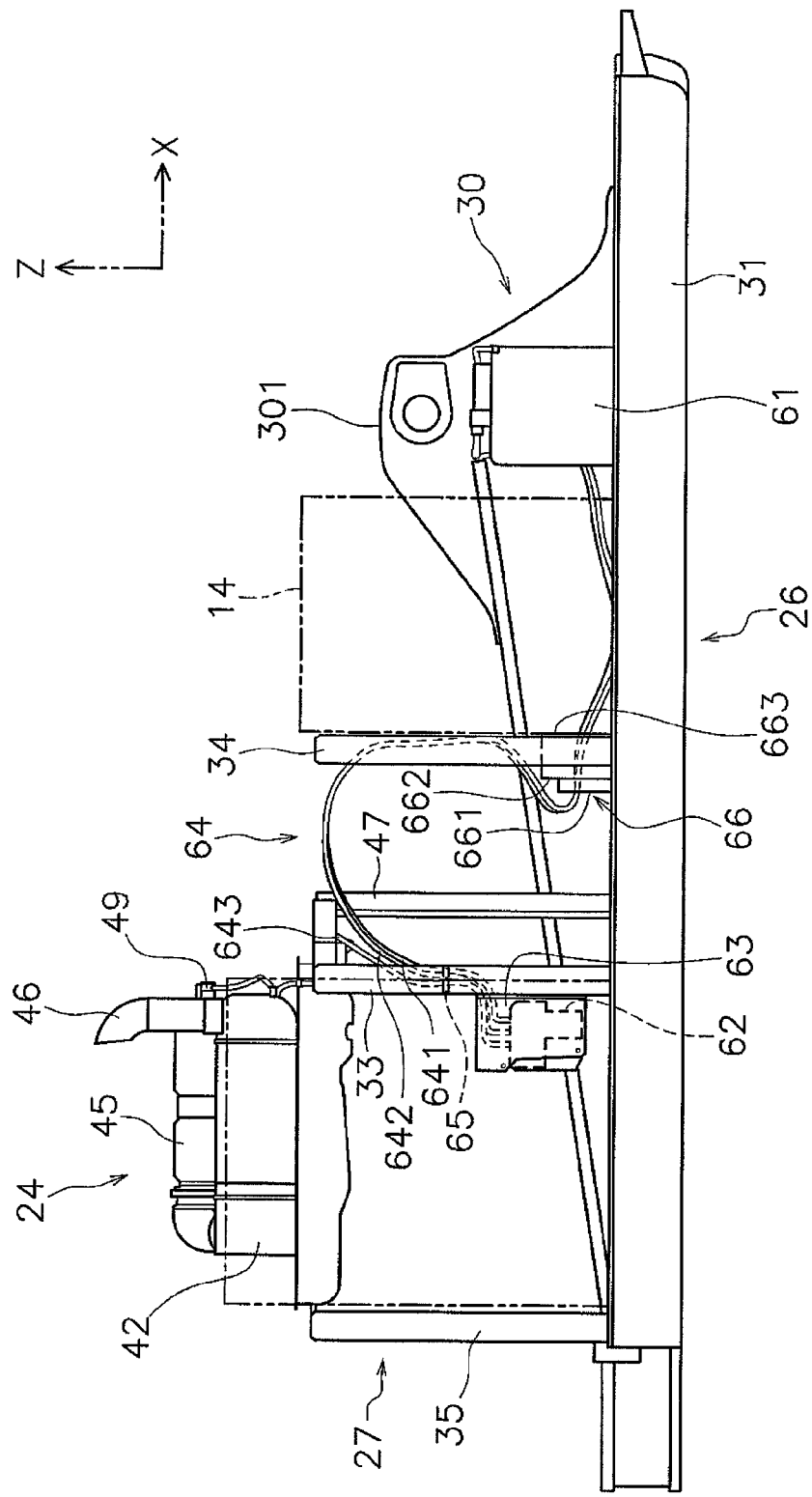
FIG. 8 is a side surface diagram illustrating the arrangement of a reducing agent pump in a hydraulic excavator according to another embodiment.

As shown in FIG. 8, the reducing agent pump 62 may be arranged at a position which does not overlap with the first column member 33 when viewed from the vehicle width direction. In this case, when accessing the reducing agent pump 62 from the side of the vehicle, it is difficult for the first column member 33 to become an obstacle. As a result, access to the reducing agent pump 62 is easy. In FIG. 8, the reducing agent pump 62 is arranged behind the first column member 33. However, the reducing agent pump 62 may be arranged in front of the first column member 33.

The first direction is not limited to the vehicle width direction and may be another direction. The second direction is not limited to the vehicle front and back direction and may be another direction. For example, the first direction may be the vehicle front and back direction and the second direction may be the vehicle width direction.

The configuration of the exhaust processing apparatus is not limited to the configuration described above. For example, the first processing apparatus may be a processing apparatus other than a diesel particulate filter apparatus. The second processing apparatus may be an apparatus which uses a reducing agent other than aqueous urea. The first processing apparatus and the second processing apparatus may be arranged at positions which are different to the positions described above. The first processing apparatus is not limited to a cylindrical shape or the like and may be other shapes such as an elliptical shape, a rectangular shape, or the like. The second processing apparatus is not limited to a cylindrical shape or the like and may be other shapes such as an elliptical shape, a rectangular shape, or the like. The first to third connecting pipes may be arranged at positions which are different to the positions described above. For example, the second connecting pipe may be arranged below the first processing apparatus and the second processing apparatus.

The predetermined device which is arranged in the vicinity of the second column member is not limited to a fuel filter apparatus and may be another apparatus. The predetermined device may be attached to the second column member.

According to the present invention, it is possible to improve ease of maintenance of a reducing agent pump in a hydraulic excavator.

The invention claimed is:

1. A hydraulic excavator comprising:
   an engine;
   a selective catalytic reduction apparatus configured to process exhaust from the engine;
   an outer cover;
   a first column member supporting the outer cover;
   a reducing agent tank configured to retain a reducing agent; and
   a reducing agent pump configured to supply the reducing agent from the reducing agent tank to the selective catalytic reduction apparatus,
   the reducing agent pump being attached to the first column member.

2. The hydraulic excavator according to claim 1, further comprising:
   a second column member separated from the first column member in a horizontal direction; and
   a predetermined device arranged adjacent to the second column member.

3. The hydraulic excavator according to claim 2, wherein the second column member supports the outer cover.

4. The hydraulic excavator according to claim 2, wherein the reducing agent pump and the predetermined device are arranged at a common height.

5. The hydraulic excavator according to claim 2, wherein the predetermined device is a fuel filter apparatus.

6. The hydraulic excavator according to claim 5, further comprising:
   a fuel tank configured to retain fuel, the reducing agent tank, the fuel tank, the fuel filter apparatus, and the reducing agent pump being arranged to line up in order in a vehicle front and back direction.

7. The hydraulic excavator according to claim 1, further comprising:
 a cooling apparatus arranged further to an inside of the hydraulic excavator than the first column member in a predetermined first direction on a horizontal plane,
 the reducing agent pump being arranged at a position overlapping the first column member as viewed along the first direction.

8. The hydraulic excavator according to claim 1, further comprising:
 a cooling apparatus arranged further to an inside of the hydraulic excavator than the first column member in a predetermined first direction on a horizontal plane,
 the reducing agent pump being arranged at a position not overlapping the first column member as viewed along the first direction.

9. The hydraulic excavator according to claim 1, further comprising:
 a center frame extending in a vehicle front and back direction,
 the outer cover defining an outer side surface of the hydraulic excavator, and
 the reducing agent pump and the reducing agent tank being arranged at a common lateral side with respect to the center frame.

10. The hydraulic excavator according to claim 9, further comprising:
 a reducing agent hose connected with the reducing agent pump, the reducing agent hose being arranged along the center frame.

11. The hydraulic excavator according to claim 1, further comprising:
 a reducing agent hose connected with the reducing agent pump; and
 a support member supporting the reducing agent hose, the support member being attached to the first column member.

* * * * *